United States Patent Office 3,060,143
Patented Oct. 23, 1962

3,060,143
CERTAIN DI-LOWER ALKYL AMINO LOWER ALKYL-POLYMETHYLATED TETRAHYDRO-PYRIDINES AND SALTS THEREOF
Glyn Evan Lee, Romford, and William Robert Wragg, Woodford Green, England, assignors to May & Baker Limited, Dagenham, Essex, England, a British company
No Drawing. Filed June 19, 1959, Ser. No. 821,389
Claims priority, application Great Britain June 24, 1958
3 Claims. (Cl. 260—294.8)

This invention relates to certain di-lower alkyl amino lower alkyl-polymethylated tetrahydropyridines and salts thereof, and more particularly to new tetrahydropyridine derivatives of therapeutic utility, to processes for their preparation and to pharmaceutical compositions containing them.

According to the present invention, there are provided new tetrahydropyridines of the formula:

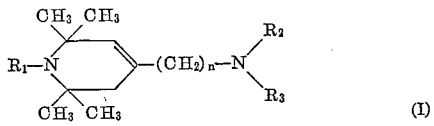

where $R_1$ represents a hydrogen atom or a lower alkyl group, $R_2$ and $R_3$ represent lower alkyl groups, and $n$ is 2, 3, or 4, and their acid addition salts. These compounds are of therapeutic value, more particularly as hypotensive and ganglion-blocking agents. The preferred compounds of the invention are 4-(3-dimethyl-aminopropyl)-1,2,2,6,6-pentamethyl-1,2,3,6 - tetrahydro-pyridine and its acid addition salts.

According to a feature of the invention the tetrahydro-pyridines of Formula I are prepared by the dehydration of a piperidinol of the formula:

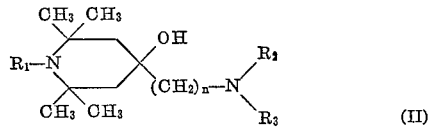

(wherein $R_1$, $R_2$, $R_3$ and $n$ are as hereinbefore defined) by known methods for the dehydration of piperidinols, using, for example, sulphuric acid.

The piperidinols of Formula II may conveniently be prepared by the reaction of a piperidone of the formula:

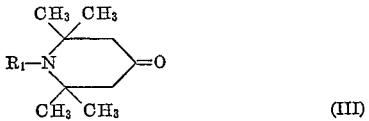

with a Grignard derivative of the formula:

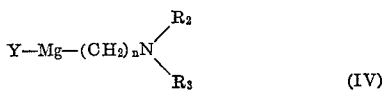

(wherein Y represents a halogen atom and $R_1$, $R_2$, $R_3$, and $n$ are as hereinbefore defined). The reaction is carried out by the methods commonly used for Grignard reactions. When $n$ has the value of four it is preferable to react the compound of Formula III with a Grignard reagent of formula:

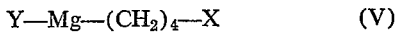

wherein Y is as hereinbefore defined and X is a radical convertible to the group

For Example X may be a phenoxy group convertible by fission with hydrogen bromide and subsequent replacement of the bromine atom by the amino group

by known methods.

The expression "known methods" used in this specification means methods heretofore used or described in the chemical literature.

When the compounds of Formula I are used for therapeutic purposes in the form of acid addition salts, it should be understood that only those such salts should in practice be employed as contain anions that are relatively innocuous to the animal organism when used in therapeutic doses so that the beneficial physiological properties inherent in the parent compound are not vitiated by side-effects ascribable to those anions; in other words, only non-toxic salts are contemplated. Suitable acid addition salts include hydrohalides (for example hydrochlorides), phosphates, nitrates, sulphates, maleates, fumarates, citrates, tartrates, methane sulphonates and ethane disulphonates. These salts may be made from the bases of Formula I by the methods heretofore used in the art for making acid addition salts. For example, the acid addition salts may be made by mixing the required base with an equivalent quantity of a non-toxic acid in a solvent and isolating the resultant salt by filtration after, if necessary, evaporation of part or all of the solvent. They may be purified by crystallisation or by any other method commonly used in the art.

The following examples illustrate the invention.

*Example I*

2,2,6,6-tetramethyl-piperid-4-one (38.75 g.) (Francis, J.C.S. (1927), 2897) in ether (75 ml.) was added at —15° C. to 3-dimethylaminopropyl magnesium chloride (from magnesium turnings 12.16 g. and dimethylamino-propyl chloride 60.75 g.) in ether (100 ml.) during 20 minutes. The reaction mixture was now warmed slowly to room temperature (during 1 hour) and then heated at reflux for 2 hours. The resulting suspension was cooled in an ice water bath and treated with ice (18 g.) and 50% w./v. aqueous sodium hydroxide (40 ml.). The solution was filtered and the residue extracted with boiling chloroform. The ethereal filtrate and the chloroform extract were bulked and dried over sodium sulphate. The dried solutions were concentrated in vacuo to give a residue which was fractionated to give 4-(3-dimethyl-aminopropyl)-2,2,6,6-tetramethyl-piperidin-4-ol (36 g.) as a colourless oil, B.P. 143° C./9 mm.

A portion of this base (3.5 g.) was dissolved in 50% w./v. sulphuric acid (35 ml.). This solution was refluxed for 4 hours. After cooling, the solution was rendered strongly alkaline and extracted with ether. The bulked ethereal extracts were dried over magnesium sulphate, filtered and concentrated in vacuo. The residue was distilled to give 4-(3-dimethylaminopropyl)-2,2,6,6-tetramethyl-1,2,3,6-tetrahydropyridine (2.1 g.) as a pale yellow oil, B.P. 129–130° C./13 mm.

*Example II*

4-(3-dimethylaminopropyl)-2,2,6,6 - tetramethylpiperi-din-4-ol (25 g., prepared as described in Example I) was heated with 40% w./v. aqueous formaldehyde (125 ml.) at 95–100° for 18 hours. The cooled solution was made strongly acid with concentrated hydrochloric acid (36 ml.) and concentrated in vacuo on a steam bath. The residue was dissolved in water and rendered strongly alkaline. The precipitated base was extracted into chloroform, dried over magnesium sulphate, filtered and concentrated in vacuo. The residue was fractionated to give 4-(3-dimethylaminopropyl) - 1,2,2,6,6 - pentamethylpiperidin-4-ol (21 g.), B.P. 120° C./0.1 mm., M.P. 35–37° C.

A sample of this base (18 g.) was dissolved in a mixture of acetic anhydride (700 ml.) and 95% w./w. sulphuric acid (7.8 ml.). The solution was heated under reflux for 3 hours. The solution was concentrated to 250 ml. at atmospheric pressure. The solution was now concentrated to small bulk in vacuo. The residue was dissolved in water, rendered strongly alkaline and ether extracted. The bulked ethereal extracts were dried over magnesium sulphate, filtered and concentrated in vacuo. The residue was fractionated to give 4-(3-dimethylaminopropyl)-1,2,2-6,6-pentamethyl-1,2,3,6 - tetrahydropyridine (12 g.) as a colourless oil, B.P. 89–91° C./0.15 mm.

The present invention includes within its scope pharmaceutical compositions which comprise one or more compounds of Formula I or their acid addition salts as aforesaid together with a pharmaceutical carrier the proportion of active constituent being between 0.025% and 50% by weight in the case of injectable compositions and between 0.1% and 95% by weight in the case of preparations for oral administration. The invention includes especially such compositions made up for oral or parenteral administration. In clinical practice the compounds of the present invention will normally be administered orally so that compositions suitable for oral administration are preferred.

Solid compositions for oral administration include compressed tablets, pills, dispersible powders, and granules. In such solid compositions one or more of the active compounds of the invention is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention, for oral administration, also include capsules of absorbable material such as gelatin containing one or more of the active substances of the invention with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage shall be obtained. Obviously several unit dosage forms may be administered at about the same time. The preparations of the present invention preferably contain between 0.1% and 10% by weight of active substance in the case of injectable solutions and between 1% and 20% by weight of such substance in the case of oral preparations.

The following examples will serve to illustrate pharmaceutical compositions according to the invention.

*Example III*

Tablets of the formula:

| | Mg. |
|---|---|
| 4-(3-dimethylaminopropyl)-1,2,2,6,6 - pentamethyl-1,2,3,6-tetrahydropyridine hydrogen tartrate | 10 |
| Lactose | 49.5 |
| Starch | 20 |
| Dextrin | 20 |
| Magnesium stearate | 0.5 | are prepared by mixing the 4-(3-dimethylaminopropyl)-1,2,2,6,6-pentamethyl-1,2,3,6-tetrahydropyridine hydrogen tartrate, lactose, starch, and dextrin and passing the mixture through a 60 mesh sieve. The magnesium stearate is then added and the mixture is made into granules of a suitable size which are then compressed into tablets.

*Example IV*

An injectable solution is prepared by dissolving 4-(3-dimethylaminopropyl)-2,2,6,6-tetramethyl - 1,2,3,6 - tetrahydropyridine dihydrochloride (0.25 g.) in distilled water (to make 100 ml. of solution). The solution is then filtered into ampoules which are subsequently sterilised in an autoclave.

*Example V*

A sterile injectable solution suitable for therapeutic use having the formula:

| | |
|---|---|
| 4-(3,dimethylaminopropyl)-1,2,2,6,6 - pentamethyl-1,2,3,6-tetrahydropyridine dihydrochloride | 0.5 g. |
| Chlorocresol | 0.2 g. |
| Distilled water | Up to 100 ml. | is prepared by dissolving the 4-(3-dimethylaminopropyl)-1,2,2,6,6-pentamethyl-1,2,3,6-tetrahydropyridine dihydrochloride in the distilled water in which the chlorocresol has already been dissolved. The solution so obtained is sterilised by heating in an autoclave at 10–15 lbs./sq. in. for 30 minutes.

We claim:

1. A member of the class consisting of the tetrahydropyridines of the formula:

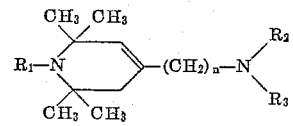

and their pharmaceutically acceptable acid addition salts, where $R_1$ is selected from the class consisting of hydrogen and lower alkyl, $R_2$ and $R_3$ are lower alkyl and $n$ is an integer greater than 1 and less than 5.

2. 4-(3-dimethylaminopropyl) - 1,2,2,6,6 - pentamethyl-1,2,3,6-tetrahydropyridine.

3. A pharmaceutically acceptable acid addition salt of 4-(3-dimethylaminopropyl)-1,2,2,6,6-pentamethyl-1,2,3,6-tetrahydropyridine.

References Cited in the file of this patent

UNITED STATES PATENTS

| 2,797,224 | Offe | June 25, 1957 |
| 2,838,441 | Allen et al. | June 10, 1958 |